United States Patent [19]

St. Clair

[11] 3,859,855

[45] *Jan. 14, 1975

[54] TEMPERATURE COMPENSATED ROTARY GAS METER

[75] Inventor: Theodore A. St. Clair, Fairfield, Conn.

[73] Assignee: Textron Inc., Providence, R.I.

[ * ] Notice: The portion of the term of this patent subsequent to Jan. 1, 1991, has been disclaimed.

[22] Filed: July 12, 1973

[21] Appl. No.: 378,780

[52] U.S. Cl. ................................................ 73/254
[51] Int. Cl. .............................................. G01f 3/08
[58] Field of Search .... 73/194 M, 231 M, 232, 233, 73/254, 261

[56] References Cited
UNITED STATES PATENTS

| 1,850,425 | 3/1932 | Taylor | 73/254 X |
| 2,258,878 | 10/1941 | Bassler | 73/254 |
| 2,531,620 | 11/1950 | Grise | 73/232 |
| 3,782,196 | 1/1974 | St.Clair | 73/254 |

*Primary Examiner*—Richard C. Queisser
*Assistant Examiner*—John P. Beauchamp
*Attorney, Agent, or Firm*—Arthur A. Johnson

[57] ABSTRACT

There is disclosed a rotary type gas meter having a shaft, a primary rotor section and a secondary rotor section proportional to each other in displacement, the rotors of each section being secured to said shaft, and a temperature controlled valve means which diverts portions of the output of the primary rotor section proportionally to either the inlet of the primary rotor section or to the inlet of the secondary rotor section, the proportions being such that the total flow of metered gas issuing from said meter is adjusted to a base temperature in accordance with Charles law regardless of the temperature of the flowing gas.

4 Claims, 2 Drawing Figures

PATENTED JAN 14 1975   3,859,855

TEMPERATURE COMPENSATED ROTARY GAS METER

This invention relates to gas meters of the rotor type, and more particularly to means for compensating for variations in the temperature of the gas being metered.

As established by Charles law, when the absolute temperature of the gas increases, the volume of the gas increases and, on the contrary, when the absolute temperature of the gas decreases, the volume of the gas decreases. However, a volumetric meter as heretofore made will measure only the volume of the gas flow regardless of the temperature of the gas, indicating the true or corrected volume of the gas flow only when operating at or adjusted for a particular base temperature.

Heretofore, it was proposed to compensate for variations in the temperature of the gas flowing through a rotary meter by means correcting the output count of the index mechanism, but such means are very expensive and lack accuracy in that the correction is applied to the full output of the meter rather than only to a percentage of the gas needing correction.

An object of the present invention is to provide means whereby the quantity of gas, i.e., the B.T.U., supplied to the customer is accurately volumetrically measured notwithstanding the variations in the absolute temperature of the gas passing through the meter.

A feature of the invention is the provision of a primary displacement means constructed to measure a predetermined volume of gas passing through the meter at a maximum absolute temperature, but for lower temperatures when the gas is more dense to return from the volume of gas flowing through said primary displacement means a quantity of gas which is equal to the difference in volume at said maximum absolute temperature and the volume of gas at the absolute temperature existing at the instant the gas is flowing.

As in my copending application, Ser. No. 229,943, filed Feb. 28, 1972, now U.S. Pat. No. 3,782,196, an important feature of this invention is the provision of means whereby the compensation for the variations in the temperature of the flowing gas is made in the meter itself, thus obviating the need for a compensating indexing device.

In the form of the invention herein illustrated and described, the objects of the invention are attained by measuring and indexing a determinate volume of gas at a maximum absolute temperature, delivering a known quantity of B.T.U. and at lower temperatures subtracting from said volume of gas an amount which equals the difference in volume between gas at said maximum temperature and gas at its temperature then flowing through the meter and returning said subtracted volume to the inlet side of the meter, whereby the said known quantity of B.T.U. are delivered at the outlet of the meter.

Other features and advantages will hereinafter appear.

Figure 1:
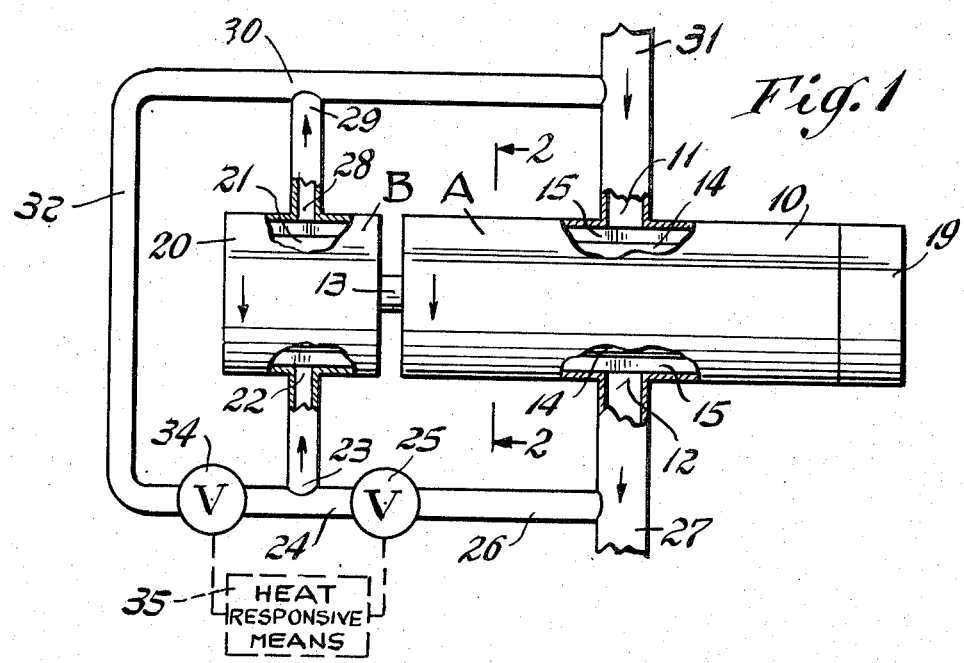
FIG. 1 is a schematic view with which to explain the principle of operation of the meter of the present invention.
Figure 2:
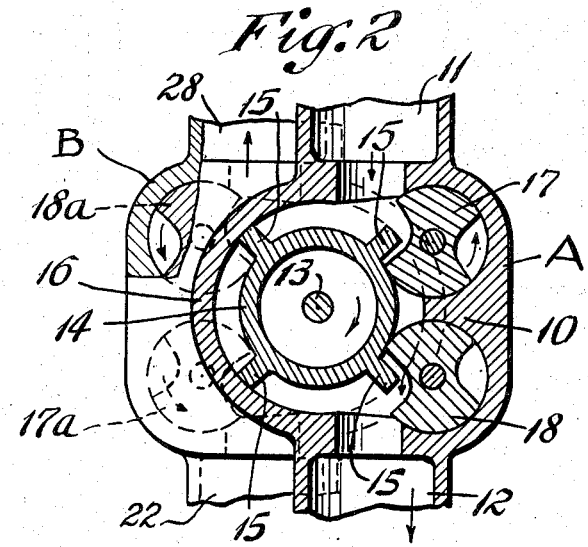
FIG. 2 is a vertical section taken on the line 2—2 of FIG. 1 showing the primary rotor unit with its valve mechanism, the valve mechanism of the secondary rotor unit being indicated by dotted lines.

As shown in the accompanying drawing, the meter of the present invention comprises a primary rotor unit A having a stator 10 having an inlet port 11 and an outlet port 12. A shaft 13 in the stator 10 carries for rotation therewith a primary rotor 14 having radial vanes 15 engaging one side of a semicircular wall portion 16 of the stator 10, the body of the rotor 14 being engaged on the other side by rotary valves 17 and 18 whereby gas which flows through the inlet port 11 impinges on the vanes 15 and causes rotation of the rotor 14 clockwise, as shown in FIG. 2, and passes out of the stator 10 through the outlet port 12. The capacity of the primary rotor 14 is such that in each revolution thereof a predetermined unit quantity of gas at a maximum temperature flows from the inlet port 11 through the primary stator 10 to the outlet port 12, and this is registered by the index mechanism 19, the outline of which is shown in FIG. 1.

As far as above described, the pressure of the incoming gas being substantially constant, the volume of gas flowing through the outlet port 12 would depend on the absolute temperature of the gas rather than an exact or corrected volume for which the indexing mechanism 19 is calibrated. The corrected volume and B.T.U. content of the gas would be greater at lower gas temperatures because the density would be increased, and less at higher gas temperatures since the density would be decreased. This obviously undesirable condition has been obviated in a simple and expeditious manner by the present invention.

For this purpose the primary displacement rotor 14 is designed to have a predetermined displacement for each revolution so that when the gas is at designed maximum temperature the flow of a predetermined volume of gas registered by the indexing mechanism 19 will be automatically corrected to the base temperature. As gas temperature decreases (and density increases), according to the present invention, the flow of gas from the primary rotor 14 to the outlet 12 is reduced by diverting back to the inlet 11 a volume of gas proportional to the difference between the maximum and existing absolute temperature of the gas.

This is accomplished in the form of the invention herein disclosed by providing a secondary displacement rotor unit B having a stator 20 and rotor 21, which may be mounted on and directly driven by shaft 13, through which a portion of the gas may flow concurrently with the flow of gas through the primary displacement rotor 14. The rotor 21 is engaged in the chamber of the stator 20 by rotary valves 17a and 18a shown in dotted lines and by a portion of the frame broken away as shown in FIG. 2 the same as the valves 17 and 18 of the primary rotor 14 except that they are arranged to cause gas to flow in the opposite direction from that of the gas in the primary rotor unit as indicated by the arrows in the drawing.

As shown in FIG. 1, the primary stator 10 and secondary stator 20 are separate units, but they may be formed as one unit as illustrated in my copending application aforesaid, now U.S. Pat. No. 3,782,196. The displacement of the secondary rotor unit B is proportional to that of the primary rotor unit A and may have the same number of vanes 18a as the vanes of the primary rotor, the arrangement of the valve 17a causing the flow of gas in the secondary rotor unit B to be opposite to that in the primary rotor unit A.

In the form of my invention illustrated herein, the secondary rotor unit B has an inlet port 22 connected by conduit 23, conduit 24, valve 25 and conduit 26 to the outlet pipe 27 connected to the outlet 12 of the primary rotor unit A. The outlet port 28 of the secondary rotor unit B is connected by conduit 29 and conduit 30 to the inlet pipe 31 leading to the inlet 11 of the primary rotor unit A.

The conduit 29 is also connected to a conduit 32 connected to a valve 34 which is connected to the conduit 24.

The valves 25 and 34 are jointly controlled by heat responsive means 35.

When the gas flowing through the outlet port 12 is at maximum temperature, say 100° 1F., the valve 25 is in closed position in which it blocks the flow of gas from the primary rotor unit A to the inlet 22 of the unit B and causes the full output of the primary rotor 14 to flow through the outlet conduit 27. The valve 34 would be open so that gas entering from the inlet 31 through conduits 30 and 32 would merely recirculate through the rotor unit B. However, as the temperature of the gas lowers, the heat responsive means 35 causes the valve 25 to gradually open and allow gas to be drawn from the outlet conduit 27 by the rotating secondary rotor 21 with the result that part of the output of the secondary rotor unit B passes through conduits 29 and 30 to the inlet conduit 31 and the inlet 11 of the rotor unit A to be again measured.

When the flowing gas reaches minimum temperature, say 0° F., the valve 25 will have completely opened and the valve 34 completely closed so that substantially the entire output of the secondary rotor 21 flows through the conduits 29 and 30 from the outlet 27 to the inlet 11 of the rotor A. At absolute temperatures between maximum and minimum of the gas flowing through the meter, the gas passing through the secondary rotor unit B is proportionally throttled to control the quantity of gas flow to the outlet 27. The flow of gas through the secondary rotor unit B is made possible by controlling the size and shape of the orifice of the valve 34 so that there is greater gas pressure at the outlet port 28 than at the inlet port 22 of the rotor unit B.

It should be understood that the temperatures of the gas herein mentioned are by way of examples and that the meter may be designed to respond to higher or lower absolute temperatures and to a greater range of temperatures if desired, it being merely necessary to proportion the displacement of the primary and secondary rotor units according to Charles law.

It should be understood that any suitable heat-responsive means may be employed.

For example:

For a design which corrects between 0° F. and 100° F. (460°R and 560°R):

Let $V_A$ = Unit displacement of meter A
Let $V_B$ = Unit displacement of meter B $$V_{100°} = V_A$$
$$V_{0°} \neq V_A - V_B$$

Therefore:

$$V_A/V_A - V_B = 560/460$$
$$V_A = 5.6 \, V_B$$

Therefore the unit displacement of meter A should be exactly 5.6 times the displacement of meter B.

Theoretically the percentage flow of meter A passing through valve 25 to the inlet of meter B is dependent upon the absolute outlet temperature ($t$), as % Flow at ($t$) =

$$[(V_A - V_A (t/560))/V_A] \quad 100$$

% at 100° F. =

$$[(V_A - V_A (560/560))/V_A] \quad 100 = 0$$

% at 0° F. =

$$[(V_A - V_A (460/560))/V_A] \quad 100 = 17.86$$

Using the above example at 100° F. the gas would enter inlet 31, would pass through rotor unit A to outlet conduit 27. Heat responsive means 35 would close off valve 25 and fully open valve 34 to bypass gas through rotor unit B so that only the volume as measured by rotor unit A would be flowing. At 0° F. valve 25 would be fully opened and valve 34 would be fully closed so that the total volume flowing would be the difference of the displacements of rotor units A and B. The actual volumetric flows at these temperatures would be directly related to a specific flow at the base temperature, usually 60° F. At intermediate gas flowing temperatures valves 34 and 25 would be proportionately throttled (in actuality the positioning of valve 25) to subtract from the flow issuing from rotor unit A and bypass the amount subtracted back to the inlet of rotor unit A in accordance with flowing temperature requirements. It should be noted that the proportionality of flow rate through valves 25 and 34 remains constant regardless of the system operating pressure, since at any specific differential pressure ratio across these valves the flow rate will change by a factor of the square root of the absolute static pressure, affecting each valve equally.

Variations and modifications may be made within the scope of the claims and portions of the improvements may be used without others.

I claim:

1. A rotary gas meter comprising inlet means, outlet means, primary rotor means having a capacity to meter a predetermined volume of gas flowing through the meter from the inlet means to the outlet means, at a determinate maximum absolute temperature, a secondary rotor means, means connecting said primary rotor means to said secondary rotor means for synchronous rotation, means connecting said secondary rotor means to said inlet means and said outlet means, said secondary rotor means having the capacity to flow a quantity of gas which is equal to the difference in said predetermined volume of the gas at said maximum absolute temperature and the volume of the same gas at said minimum absolute temperature, temperature responsive means responsive to the absolute temperature of the gas flowing through the meter including valve means for controlling the output of said secondary rotor means as a function of the difference in absolute temperature between said predetermined maximum absolute temperature and then existing absolute temperature of the gas flowing through the meter; and indexing means connected to and responsive to the operation of said rotor means.

2. A rotary gas meter as defined in claim 1 in which there are conduit means including a valve between the outlet means of said primary rotor means and the inlet means of said secondary rotor means, and said temperature responsive means is operative to open or close said valve more or less proportional to the decreasing or increasing of the absolute temperature respectively of the gas flowing through the primary rotor means.

3. A rotary gas meter according to claim 1 in which said valve means for controlling the output of said secondary rotor means includes a valve located between the outlet of the primary rotor means and the inlet of the secondary rotor means.

4. A rotary gas meter according to claim 1 in which said valve means for controlling the output of said secondary rotor means includes a valve located between the outlet of the primary rotor means and the inlet of the secondary rotor means and additional valve means located between the outlet of said secondary rotor means and the inlet thereof.

* * * * *